United States Patent [19]

Parén et al.

[11] Patent Number: 5,417,752
[45] Date of Patent: May 23, 1995

[54] PRODUCT CONTAINING SILICON DIOXIDE AND A METHOD FOR ITS PREPARATION

[75] Inventors: Aarto Parén; Pekka Vapaaoksa, both of Valkeakoski, Finland

[73] Assignee: Kemira Fibres Oy, Valkeakoski, Finland

[21] Appl. No.: 256,125

[22] PCT Filed: Dec. 29, 1992

[86] PCT No.: PCT/FI92/00363
§ 371 Date: Jun. 28, 1994
§ 102(e) Date: Jun. 28, 1994

[87] PCT Pub. No.: WO93/13249
PCT Pub. Date: Jul. 8, 1993

[30] Foreign Application Priority Data
Dec. 31, 1991 [FI] Finland ............... 916187

[51] Int. Cl.$^6$ ............... C09D 5/18; C09D 101/02
[52] U.S. Cl. ............... 106/168; 106/18.12; 106/204; 106/164
[58] Field of Search ............... 106/18.12, 166, 168, 106/204, 164

[56] References Cited

U.S. PATENT DOCUMENTS

| | | | |
|---|---|---|---|
| 3,947,276 | 3/1976 | Siclari et al. | 106/168 |
| 4,242,138 | 12/1980 | Mauric et al. | 106/168 |
| 4,981,515 | 1/1991 | Hiraoka et al. | 106/166 |

FOREIGN PATENT DOCUMENTS

| | | |
|---|---|---|
| 0006525 | 1/1980 | European Pat. Off. . |
| 0131990 | 1/1985 | European Pat. Off. . |
| 1064271 | 4/1967 | United Kingdom . |

OTHER PUBLICATIONS

Chemical Abstracts, vol. 90, No. 4, Jan. 22, 1979, Columbus, Ohio, USA, p. 68 The Abstract No. 24704s, PO, A, 88193, Politechnika Lodzka, (Nov. 30, 1976).

*Primary Examiner*—David Brunsman
*Attorney, Agent, or Firm*—Pollock, Vande Sande & Priddy

[57] ABSTRACT

A product contains silicon dioxide in the form of polysilicic acid in a supporting structure of cellulose. The polysilicic acid contains aluminum silicate sites. In the preparation of the product the cellulose and the silicon dioxide in the form of polysilicic acid are blended to obtain the product in solid form. The obtained blended product is modified with a compound containing aluminum, such as a solution aluminate, which causes the formation of aluminum silicate sites on the polysilicic acid. The cellulose used is viscose cellulose.

8 Claims, 3 Drawing Sheets

FIG. I

PRODUCT CONTAINING SILICON DIOXIDE AND A METHOD FOR ITS PREPARATION

BACKGROUND OF THE INVENTION

The invention concerns a product containing silicon dioxide and a method for its preparation.

Considerable demand has grown on markets in recent years for fibres which are either incombustible or resistant to combustion. Consequently a number of fibres have appeared on the market which are suitable for textiles inhibiting fire. Fibres containing silicon dioxide are outstanding in their fire-resistance, and they are manufactured by various methods including the Enka method in which regenerated silicon dioxide fibres are spun by the dry method from a waterglass solution from which the excess water has been removed prior to regeneration; this method is described in the patent literature in publications DE-2900990, US-4332601 and EP-160232. In other methods silicon dioxide or silicate glass are used as the raw material, but products made by the former method are expensive while those made by the latter method are too fragile.

GB patent 1064271 presents a relatively inexpensive method for the manufacture of a product containing silicon dioxide. In this case the viscose containing an evenly distributed quantity of sodium silicate is spun in an acid spinbath, where the viscose is regenerated into cellulose and the sodium silicate contained in it is precipitated as polysilicic acid, which is a water-containing form of silicon dioxide evenly distributed throughout the cellulose.

The products manufactured by the above method, for example in the form of fibres, have proved to be extremely usable and inexpensive by virtue of the production method, and because of the water bound in them fire resistant in specific conditions. The fibres have been used in a number of applications including particularly nonwovens and upholstery textiles. During applications development a number of shortcomings have been revealed due to which the fibres are not very suitable for clothing textiles or textiles where a very high level of fire resistance is required. In order to obtain a sufficiently high level of fire resistance the proportion of polysilicic acid should be as high as possible, but for technical reasons it cannot be raised much above 40 percent. One severe disadvantage in textiles which are likely to be washed frequently is that polysilicic acid has a low tolerance of alkaline conditions. It has been observed that using ordinary washing agents the content of polysilicic acid falls to about half the original after only 20 washing cycles. Even a fall of 1 to 2 percentage points in the polysilicic acid content leads to substantially greater combustibility. The high solubility of polysilicic acid in alkalis has also led to problems in dyeing.

SUMMARY OF THE INVENTION

The purpose of this invention is to provide a product containing polysilicic acid and cellulose which has better fire resistant qualities than previously. In order to realize this aim with a product according to this invention, the product is particularly characterised by the features presented in the attached claim 1. It was surprisingly observed that a product containing aluminum silicate sites presented enhanced fire resistance. The resistance was also greatly superior to that of a product containing the same quantity of polysilicic acid, aluminum silicate or aluminum hydroxide on their own. The solubility in alkalis of polysilicic acid containing aluminum silicate sites was considerably reduced, and the products can therefore be washed normally with no loss of their fire resistance. The proportion of aluminum should be between 0.5 and 20 percent, preferably 0.5 to 15 percent by weight of the product calculated as aluminum oxide in order to maintain the tenacity of the product and keep post-firing smoulder time to within reasonable limits. The quantity of aluminum as aluminum oxide may be calculated by the difference in ash after combustion at 750°–900° C. of an aluminum-treated sample and an untreated sample. When the aluminum content is at the above-mentioned maximum the carbon dioxide and carbon monoxide content of the combustion products is reduced and the water content can be increased, thus decreasing the smoke production in burning. The cellulose is preferably regenerated viscose, so that the polysilicic acid charged with aluminum silicate sites and the cellulose are equally distributed in the same phase.

The purpose of the invention is also to present a method for the manufacture of the product. A product composed of cellulose and silicon dioxide in the form of polysilicic acid is modified with a compound containing aluminum, causing the formation of aluminum silicate sites in the polysilicic acid. This treatment can be easily performed, for example by immersing the product in a solution containing an aluminum compound.

The preferable procedure is that the polysilicic acid charged cellulose be prepared by mixing the silicon dioxide in the form of an alkaline solution with viscose, after which the cellulose is regenerated by passing the viscose through an acid spinning bath. From the point of view of the viscose process a product containing aluminum silicate sites is preferably obtained with a solution containing aluminate anions such as sodium aluminate.

The invention is now explained with reference to two attached figures, wherein

DETAILED DESCRIPTION OF THE PREFERRED EMBODIMENTS

Figure 1:
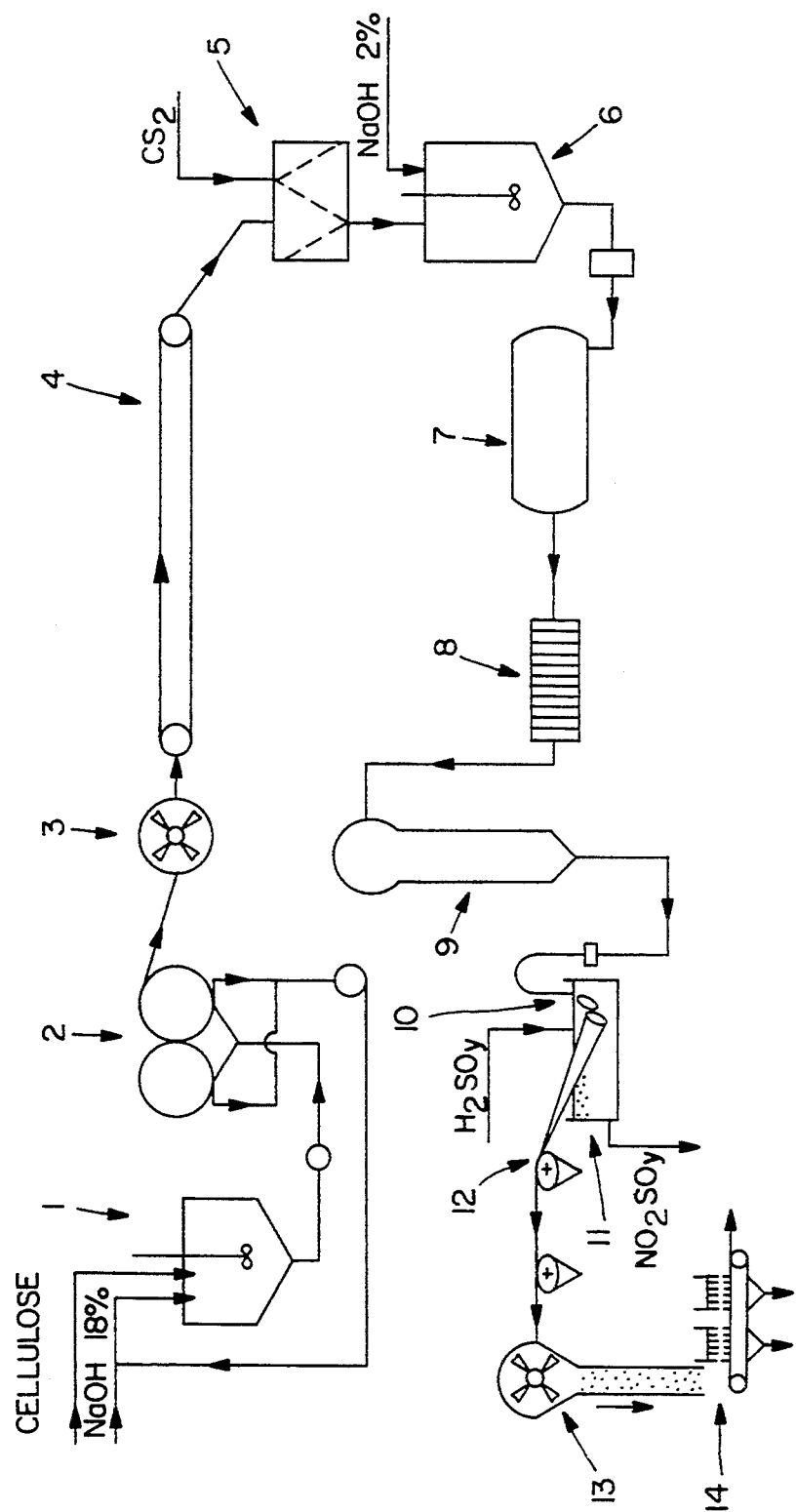
FIG. 1 a diagram of one manner of producing a fire resistant product according to the invention, FIG. 2 an illustration of the reactions taking place during this method.

The process shown in FIG. 1 begins with the steeping (1) of alpha-cellulose, where in addition to being treated with sodium hydroxide the pulp is also shredded into a slurry. After this the cellulose is pressed (2) to remove the steeping lye and the resulting alkali cellulose is further shredded (3). The alkali cellulose is conducted to pre-ageing (4) which involves partial depolymerisation of the cellulose to a value of 300 to 400. Pre-ageing is an exposure to atmospheric oxygen for a period of 3 to 5 hours at a temperature of 35° to 45° C.

The pre-aged alkali cellulose is then xanthated (5), meaning that the alkali cellulose is reacted with carbon disulphide to produce cellulose xanthogenate. After xanthation dilute sodium hydroxide is added (6) while the mixture is violently agitated. Solution of the xanthogenate is more or less complete about 1 hour of treatment. The orange syrupy viscose obtained from the dissolvers is allowed to flow through large containers in which it ripens (7). During ripening part of the xanthate groups attached to the cellulose separate out, leading to the substitution degree in the cellulose falling from about 0.45 to 0.32 to 0.35. Ripening gives the viscose its proper spinnability, and this stage is of extreme importance in terms of preparing a cellulose xanthogenate which is blended with silicon dioxide in a sodium hydroxide solution without being regenerated.

During ageing the viscose is filtered (8), for example twice. It is then blended with the aqueous solution of silicon dioxide and sodium hydroxide. In this blending an alkaline solution of silicon dioxide is used which is obtained by dissolving essentially soluble silicon dioxide to the level of 0.5 to 25 percent by weight in an aqueous solution of NaOH at a concentration of about 10 to 25 percent by weight. The preferable NaOH concentration in the viscose is between 2 and 10 percent by weight and the Na cellulose xanthate, calculated as alpha cellulose, between 5 and 20 percent. The preferable viscosity of the viscose, to which some NaOH should be added to improve its mixing characteristics, is between 3 and 25 Pas.

The manufacture of the product begins with the blending of the silicon dioxide alkaline solution and the viscose in proportions to bring the NaOH concentration in the multicomponent solution to about 20 to 80 percent by weight, preferably about 36 to 45 percent by weight, the content of Na cellulose xanthate calculated as alpha cellulose to about 5 to 70 percent by weight, preferably about 15 to 44 percent by weight and the content of silicon dioxide to between 0.1 and 70 percent by weight, preferably about 20 to 40 percent by weight, all components measured as dry weight.

The multicomponent solution of silicon dioxide alkaline solution and viscose is then formed into the desired shape. This is done by moving the mixed solution through a structure giving the form to the product into an acid regeneration bath. The multicomponent solution may, for example, be pumped through a nozzle into one or several profiles, such as through a slit die into a foil, or most preferably through spinnerettes into filaments. The precipitation of the product then takes place automatically in the manner that the regeneration solution is immediately at the outlet of the nozzle. This stage of the process is later explained with reference to aid of the drawing. A foil or sheet product can also be produced between parallel separate plates which are immersed in the acid regeneration solution.

A solid polysilicic acid—cellulose product is formed when the multicomponent solution in the desired form as described above is treated with an acid regeneration solution. The regeneration solution contains preferably about 2 to 15 percent by weight of $H_2SO_4$, about 20 to 40 percent by weight of $Na_2SO_4$ and about 0.5 to 10 percent by weight of $ZnSO_4$ at a temperature during regeneration, i.e. precipitation of about 20° to 100° C., typically about 50° to 7020 C.

The method according to this invention is at its most preferable when it takes advantage of the viscose fibre manufacturing process by mixing the silicon dioxide alkaline solution initially with the viscose at a stage where the viscose has been dissolved and preferably when the viscose has been ripened and filtered. In this case it is necessary to ensure that the multicomponent solution contains sufficient sodium in order that the polysilicic acid not regenerate the cellulose too early from its sodium xanthogenate form. The multicomponent solution of silicon dioxide, alkali and viscose then follows the normal viscose process in that forming and regeneration take place by pumping through spinnerettes direct into the acid spinning bath where the subject of this invention, a fibre material containing silicon dioxide in the form of polysilicic acid, is formed.

The addition of the silica to the viscose takes place according to the drawing after filtering at 8, after which air and gas bubbles are removed from the mixture by boiling in a continuous deaerator 9. The polysilicic acid—viscose fibres are spun by pumping through small-perforation spinnerettes 10 immersed in a solution of $H_2SO_4$—$ZnSO_4$ or the spinbath 11. The multicomponent solution is filtered and pumped to pipes ("candles") immersed in the spinning bath. Each candle has a spinnerette at the far end which is immersed to a depth of about 60 cm in the spinbath. Appropriate spinnerettes for this purpose have about 8,000 to 50,000 perforations with a diameter of about 50 to 80 μm. In the spinbath the soluble compound made up of silicon dioxide and sodium hydroxide and the soluble cellulose xanthate regenerate to a completely homogenous solid polysilicic acid—cellulose filament fibre.

The tow formed by the filaments extruded by one spinnerette is drawn over a spinning roll 12 and then conducted to the larger stretch roll assembly through the stretching bath. The degree of stretch is between 50 and 100 percent. Stretching imparts greater strength to the fibres. After stretching the fibres are drawn into the cutter 13 where they are cut to the required length, for example between 30 and 150 mm. The cut fibres are rinsed with water to a washing stage 14, which also opens up the adhering fibre tufts.

At this washing stage the treatment with an aluminum solution according to this invention can be carried out. The aluminum will then react strongly with the surface of the polysilicic acid if there is enough of it in the solution. The treatment can be carried out with, for example, a solution of sodium aluminate at a concentration of 0.1 to 10 percent by weight at a temperature of 0° to 100° C., preferably about 20° to 60° C., for a sufficient time.

Figure 2:
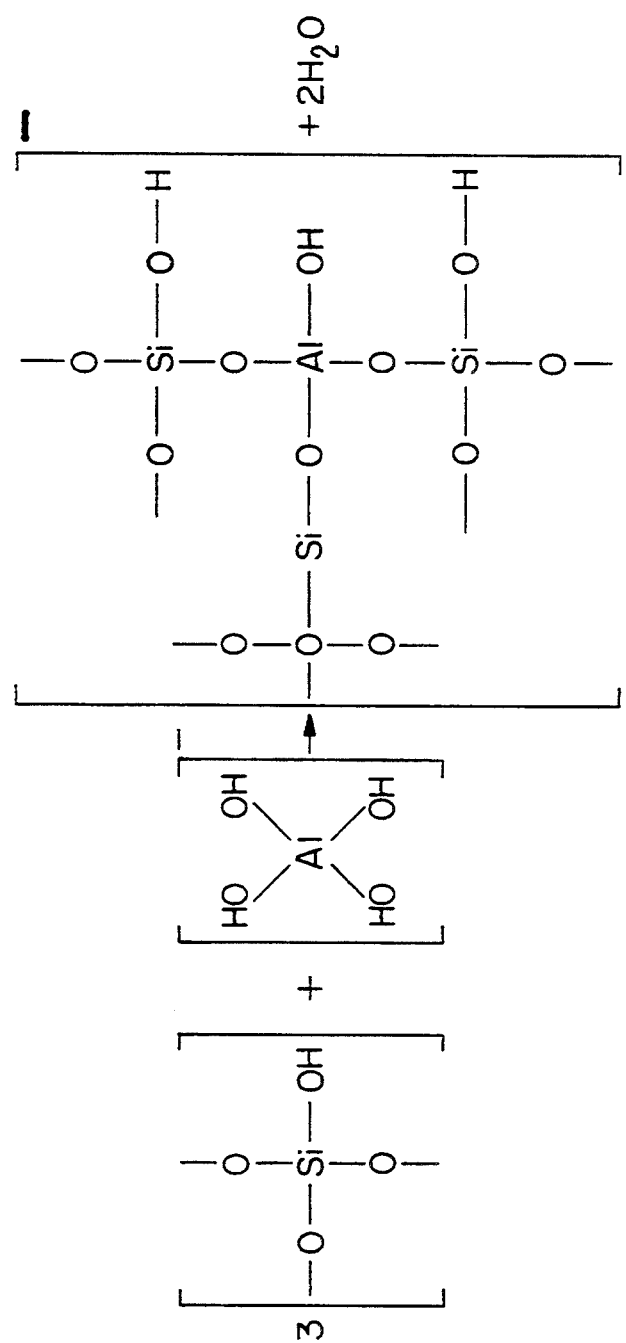
Figure 3B:
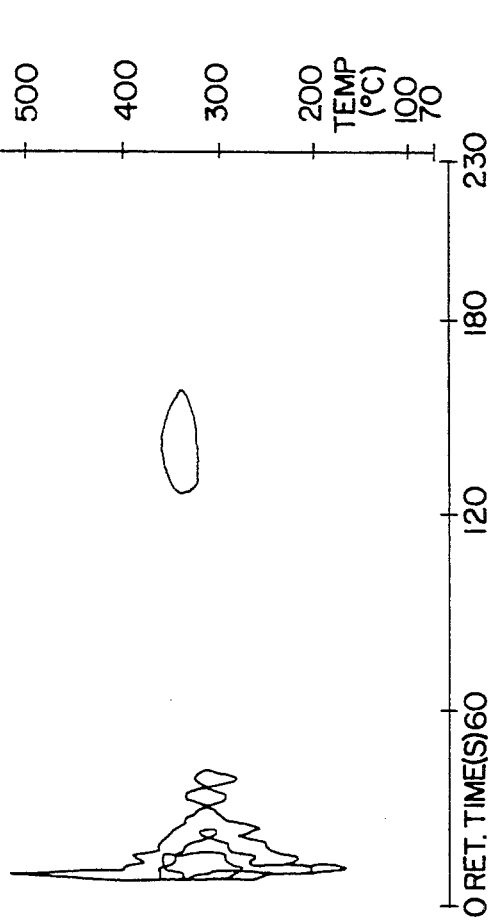
FIGS. 3A–3D show a thermochromatogram of the product according to the invention.
Figure 3D:
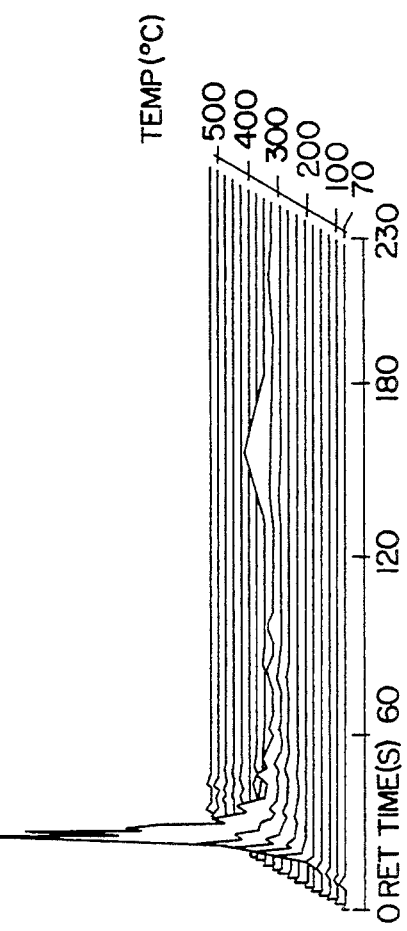
Figure 3A:
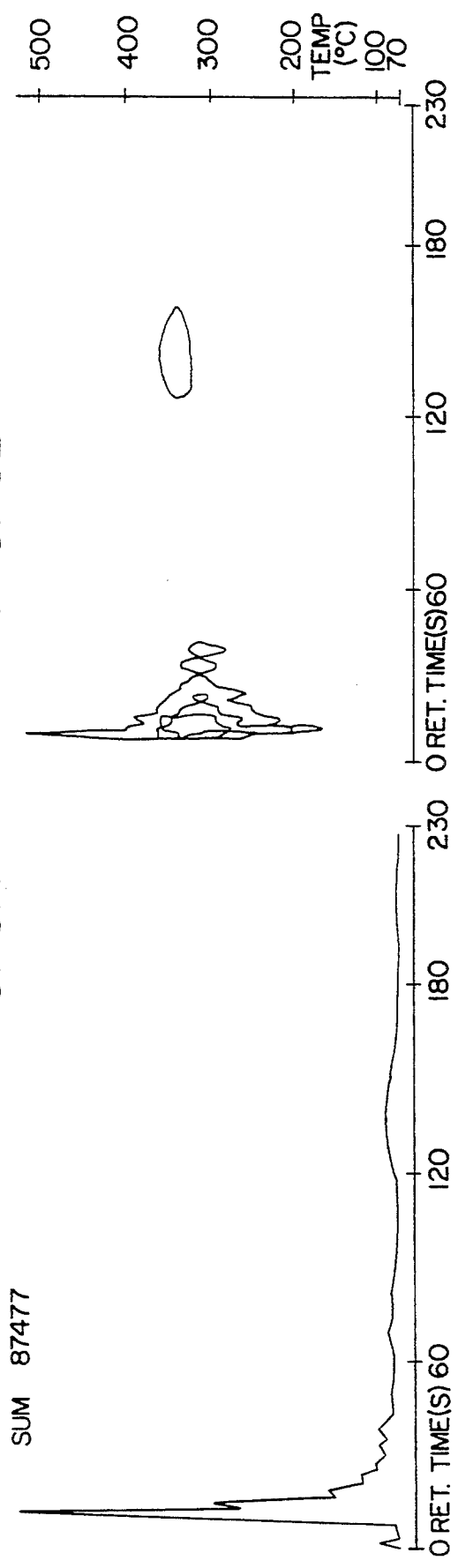
Figure 3C:
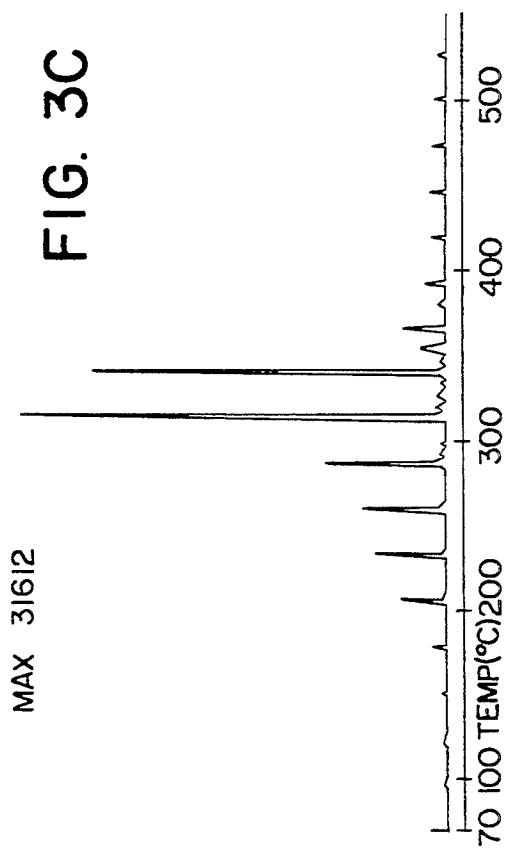

During the viscose preparation process and within the viscose the polysilicic acid has been precipitated in such a manner that its primary particles, regularly distributed in the cellulose, form into larger agglomerations with a diameter measurable in nanometers. On modification with the solution containing aluminum the surface of the polysilicic acid contained by the cellulose is converted to aluminum silicate, giving a fibre which is well resistant to washing and with a handle which does not differ from that of normal viscose fibres. When the modification solution used is sodium aluminate, the aluminate anions react with the silanol groups on the surface of the polysilicic acid to form aluminum silicate sites. As a result of the modification the surface of the fibre receives a charge which is neutralised by $Na^+$ cations. Other salts of aluminum can be used for the modification, in which case the aqueous solution made from them with the aluminum in a suitably reactive form is used in the same manner as the aluminate solution after spinning of the fibre. The attached FIG. 2 shows the reaction between the aluminate anion and the silanol groups on the surface of the polysilicic acid.

After modification the fibre may be treated in conventional ways, that is to say that it is washed, its pH is normalized by treatment with acetic acid and it is treated with surface-active agents (spin-finishing). After this the fibre is dried.

The aluminum modification reduces the solubility in water of the polysilicic acid to about a tenth of its initial condition, which leads to a substantial improvement in resistance to washing. The Limiting Oxygen Index (LOI) rises in optimum cases by about 25 percent or by 6 percentage points, without impairment of the postfiring smoulder behavior. In trials it has also been observed that in optimum cases the tenacity of the fibre increases by 20 percent.

It has also been observed that during modification the fibre is bleached as with bleaching chemicals. Trials demonstrated a rise in brightness of about 5 percentage points.

Naturally, the treatment can be carried out at any suitable stage after the regeneration bath, for example at the stretching stage or indeed during dyeing. The treatment may also be carried out when the fibre has been further processed, such as into yarn, nonwoven, knitted fabric or woven fabric.

The method may be used for the production of goods other than fibre, in which case the modification is carried out according to the principles described above during treatment after regeneration.

Silicon dioxide can be distributed in the form of polysilicic acid throughout the supporting cellulose in other manners. For example, it can be absorbed in to porous cellulose before treatment with the aluminum.

FIG. 3 shows a typical thermochromatogram obtained when a sample was heated in a thermochromatographic apparatus at a predetermined rate. The volatiles evolved were separated in a column and detected using a flame ionization detector (FID). In this way a series of chromatograms from the temperature-programmed heating were obtained. These can be combined to a 3-dimensional "map", which can serve for identifying the polymer product.

The next section deals with trials which have been performed with the invention, which trials, however, are not regarded as limits on the scope of the claimed protection for the invention.

EXAMPLE 1

Manufacture of Staple Fibre

Viscose was prepared in the normal manner related to the viscose process. To the ready viscose 167 g of waterglass per kg of viscose was added (waterglass containing 21.9% of $SiO_2$), the blended viscose thus containing $SiO_2$ and cellulose in the ratio 3:7. Before addition of the waterglass the viscose contained 8.5% alphacellulose, 5.3% NaOH and had a viscosity of 8.2 Pas. After addition of the waterglass the proportions were 7.9% alphacellulose, 3.4% $SiO_2$, 7.6% NaOH and a viscosity of 7.3 Pas.

The viscose-waterglass mixture was spun through a spinnerette with perforations of 65 μm in a spinbath containing 65 g/l of $H_2SO_4$, 20% $Na_2SO_4$ and 45 g/l $ZnSO_4$. The bath temperature was 50° C. The filament tow obtained in the spinbath was drawn over rollers and stretched in a stretching bath of water at 100° C. to a length 90% greater than its original length. The spinning speed was 40 m/s. The tow was then led to cutters where it was cut to 40 mm lengths. After this the fibre was immersed in a sodium aluminate solution. Finally the fibre was washed with water and treated with surface-active agents. Table 1 gives the properties of the fibres when treated with different solutions. Ash means the ignition remainder of the fibre when it is combusted at 750° C. for one hour. The remaining ash is then pure $SiO_2$ and, if it has been fireproofed with aluminate, a certain quantity of $Al_2O_3$.

TABLE 1

| Textile values of fibre samples | | | | | |
|---|---|---|---|---|---|
| Na-aluminate (g/l) | T, °C. | titre, dtex | tenacity, cN/dtex | elongation, % | fibre ash, % |
| 0 | 80 | 5.61 | 1.62 | 28.1 | 35.3 |
| 5 | 25 | 5.73 | 1.52 | 29.1 | 35.5 |
| 7 | 30 | 5.46 | 1.57 | 29.3 | 34.5 |
| 10 | 50 | 6.31 | 1.39 | 30.4 | 38.9 |
| 15 | 25 | 6.19 | 1.51 | 33.0 | 39.3 |
| 20 | 25 | 6.27 | 1.52 | 38.8 | 33.0 |

The soluble salts in the fibre samples were determined, and their content varied between 0.22 and 0.25%. Examined under a microscope, the cross-sections of the fibres were those of normal viscose, i.e. kidney or bean shaped, and no particle impurities were detected in the fibres.

EXAMPLE 2

Manufacture of Filament

Viscose was prepared in the normal manner associated with the viscose process. To the ready viscose was added 178 g waterglass per kg viscose, the waterglass having an $SiO_2$ content of 21.3%, giving a waterglass:viscose ratio $\approx$3:7. Before addition of the waterglass the viscose was 8.9% alphacellulose, 5.3% NaOH and the viscosity was 7.0 Pas. After addition of the waterglass the figures were alphacellulose 6.8%, $SiO_2$ 2.9%, NaOH 7.4% and viscosity 6.7 Pas.

The viscose-waterglass solution was spun through a spinnerette with perforations of 45 μm in a spinbath containing 80 g/l $H_2SO_4$, 25% $Na_2SO_4$ and 55 g/l $ZnSO_4$. The spinbath was at 50° C. The filament tow emerging from the spinbath was led over rollers and stretched in a bath of 100° C. water to 97% more than the initial length. The tow was then led through a bath containing sodium aluminate solution. The spinning speed was 20 m/s. Table 2 gives the product specifications when treated with different solutions.

TABLE 2

| Textile values for fibre samples | | | | | |
|---|---|---|---|---|---|
| Na-aluminate, g/l | T, °C. | Titre, dtex | Tenacity, cN/dtex | Elongation, % | Ash, % |
| 0 | 50 | 1.82 | 1.14 | 25.0 | 33.7 |
| 10 | 40 | 2.19 | 1.33 | 27.7 | 38.6 |
| 20 | 40 | 2.08 | 1.39 | 26.0 | 39.7 |
| 10 | 50 | 2.03 | 1.39 | 24.7 | 39.7 |
| 20 | 50 | 2.06 | 1.29 | 24.8 | 40.4 |
| 30 | 50 | 2.25 | 1.25 | 26.8 | 41.3 |

EXAMPLE 3

Manufacture of Staple Fibre

A blend of viscose and waterglass was prepared as in example 1. 264 g of waterglass per kg viscose was added (waterglass 25.1% $SiO_2$, proportions of waterglass and viscose in blend $\approx$4:6). Before the addition of the waterglass the viscose had an alphacellulose content of 8.9%, 5.4% NaOH and a viscosity of 8.0 Pas. After waterglass addition the figures were alphacellulose 6.4%, $SiO_2$ 4.2%, NaOH 7.9% and viscosity 9.7 Pas.

The waterglass-viscose blend was spun with a spinnerette with perforations 50 μm in a spinbath containing 58 g/l $H_2SO_4$, about 20% $Na_2SO_4$ and 40 g/l $ZnSO_4$. The temperature of the spinbath was 50° C. The tow obtained from the spinbath was led over rollers and stretched in a bath of water at 85° C. to 60% more than its initial length. After this the filaments were led to cutters where they were cut to 40 cm fibres. The fibre was then washed with a sodium aluminate solution. Table 3 gives the characteristics according to solution used.

TABLE 3

| Textile values for fibre samples | | | | | |
|---|---|---|---|---|---|
| Na-aluminate, g/l | T, °C. | Titre, dtex | Tenacity, cN/dtex | Elongation, % | Ash, % |
| 0 | 80 | 5.50 | 1.25 | 25.7 | 38.1 |
| 2 | 30 | 5.34 | 1.22 | 23.6 | 37.0 |
| 5 | 30 | 5.74 | 1.20 | 27.1 | 39.0 |
| 10 | 30 | 5.98 | 1.22 | 28.8 | 39.9 |
| 15 | 30 | 5.95 | 1.14 | 24.1 | 40.8 |
| 20 | 30 | 6.17 | 1.15 | 27.8 | 42.2 |

EXAMPLE 4

Staple fibre was prepared as in the previous example. The fibre samples were carded and hydroentangled, after which their LOI was determined according to standard ISO 4589 (Plastics—Determination of flammability by oxygen index. International Organization for Standardization, 1984). The results are presented in Table 4.

TABLE 4

| Na-alum., g/l | Ash, % | Type, dtex/mm | Mass, g/m² | LOI % $O_2$ |
|---|---|---|---|---|
| 0 | 31.2 | 3.5/40 | 110 | 21.6 |
| 30 | 33.1 | 3.5/40 | 120 | 30.0 |
| 40 | 32.7 | 3.5/80 | 152 | 32.2 |
| 40 | 32.7 | 3.5/80 | 153 | 33.0 |
| 40 | 32.7 | 3.5/80 | 155 | 31.4 |
| 40 | 32.7 | 3.5/80 | 284 | 34.2 |

EXAMPLE 5

Staple fibre was prepared in the manner described in earlier examples. The fibre was made with different concentrations of Na-aluminate (temperature 30° C.) and the fibres obtained (3.5 dtex/40 mm) were made into knitted fabric, the ash, LOI and brightness of which were measured. The results are presented in Table 5.

TABLE 5

| Na-aluminate, g/l | Fibre ash, % | LOI, % $O_2$ | Brightness, % |
|---|---|---|---|
| 0 | 29.8 | 24.9 | 63.0 |
| 10 | 30.3 | 27.8 | 67.5 |
| 20 | 31.4 | 30.4 | 66.4 |
| 40 | 32.0 | 31.4 | 68.5 |
| 80 | 35.9 | 30.9 | 69.1 |

EXAMPLE 6

Staple fibre (3.5 dtex/40 mm) was prepared in the manner shown in the foregoing examples. For fire protection one test was carried out using $Al_2(SO_4)_3 \cdot 16H_2O$ and another with 50 g/l sodium aluminate. The ash content of the non-fireproofed sample was 27.62%, as was the aluminum sulphate proofed sample. The ash content of the sodium aluminate proofed sample was 30.4%. The fibre was carded and hydroentangled, after which the LOI of the samples was determined (nonwoven mass ≈150 g/m²). The results are presented in table 6.

TABLE 6

| Fireproofing trials with Na-aluminate and aluminum sulphate | | | |
|---|---|---|---|
| Fireproofing agent | concentration, g/l | Ash, % | LOI, % $O_2$ |
| Not proofed | — | 27.6 | 23.7 |
| $Al_2(SO_4)_3 \cdot 16H_2O$ | 50 | 27.6 | 23.8 |
| Na-aluminate | 50 | 30.4 | 28.7 |

EXAMPLE 7

Fireproofing of Knitted Fabric

From fibre prepared according to the preceding examples (1.7 dtex/40 mm) various knitted fabrics were made and treated with Na-aluminate at the fabric stage (immersing in Na-aluminate solution at 30° C. for 3 minutes, followed by wash in water at 80° C. and drying). The results of the fire test are presented in table 7.

TABLE 7

| Results of subsequent treatment trials | | | |
|---|---|---|---|
| Mass, g/m² | Na-aluminate, g/l | Ash, % | LOI, % $O_2$ |
| 530 | 0 | 31.2 | 26.3 |
| 530 | 200 | 44.6 | 43.5 |
| 530 | 100 | 38.1 | 32.0 |
| 530 | 50 | 35.9 | 34.8 |
| 530 | 50 | 37.9 | 37.6 |
| 220 | 0 | 27.6 | 24.9 |
| 220 | 50 | 35.9 | 31.2 |
| 220 | 50 | 37.9 | 30.9 |
| 120 | 0 | 30.2 | 23.9 |
| 120 | 100 | 41.2 | 35.0 |
| 120 | 100 | 40.8 | 36.8 |

EXAMPLE 8

Fireproofing During Dyeing

From fibre prepared in the manner described above spun yarn was produced and used in the production of a knitted fabric with a mass of 530 g/m². Samples of the fabric were taken and dyed with reactive dyes in solutions with various concentrations of Na-aluminate. The results are presented in Table 8.

TABLE 8

| Dyeing trials | | | | | | | | | | |
|---|---|---|---|---|---|---|---|---|---|---|
| Component | Number of recipe | | | | | | | | | |
|  | 1 | 2 | 3 | 4 | 5 | 6 | 7 | 8 | 9 | 10 |
| Drimaren goldgelb | | | | | | | | | | |
| K2R, % | 3 | 3 | 3 | 3 | 3 | 3 | 3 | 3 | 1 | 5 |
| $Na_2SO_4$, g/l | 50 | 50 | 50 | 50 | 50 | 50 | 50 | 50 | 50 | 50 |
| $Na_2CO_3$, g/l | — | — | 10 | — | — | — | 20 | — | — | — |
| Waterglass, g/l | — | — | — | — | — | — | 5 | 5 | — | — |
| Na-aluminate, g/l | 5 | 5 | 5 | 5 | 10 | 5 | — | — | 5 | 5 |
| NaOH, g/l | — | — | — | 2 | — | — | — | 2 | — | — |

| Recipe no. | Ash, % | LOI % $O_2$ |
|---|---|---|
| Undyed | 31.6 | 26.4 |
| 1 | 30.8 | 30.1 |
| 2 | 33.3 | 34.1 |
| 3 | 32.0 | 34.6 |
| 4 | 33.1 | 34.8 |
| 5 | 32.9 | 34.7 |
| 6 | 34.0 | 34.6 |
| 7 | 25.2 | 26.8 |

TABLE 8-continued

| Dyeing trials | | |
|---|---|---|
| 8 | 29.7 | 27.4 |
| 9 | 33.4 | 35.9 |
| 10 | 33.2 | 35.3 |

Drimaren goldgelb K2R is a commercial reactive dye for cellulosics produced by Sandoz AG.

According to analysis sample 9 contained 30.4% $SiO_2$, 26.3% carbon and 5.3% $Al_2O_3$. In the other samples the increased ash compared with the undyed sample is mainly composed of $Al_2O_3$.

EXAMPLE 9

Fireproofing During Bleaching

The fibre was produced in the manner hitherto described. A knitted fabric produced from the fibre and with a mass of 220 g/m² was bleached with a Na-aluminate solution to which had been added sodium perborate or hydrogen peroxide. The results are presented in Table 9.

TABLE 9

| \multicolumn{6}{c}{Results of bleaching trial} | | | | | |
|---|---|---|---|---|---|
| Na-alum. g/l | $H_2O_2$ g/l | Na-perb. g/l | T. °C. | Ash % $O_2$ | LOI % | Whiteness |
| Unbleached knitted fabric | | | | 29.8 | 24.9 | 63.0 |
| 10 | — | 5 | 40 | 33.0 | 30.4 | 70.2 |
| 10 | — | 20 | 40 | 32.4 | 30.0 | 71.6 |
| 20 | — | 5 | 40 | 32.4 | 30.9 | 71.2 |
| 20 | — | 20 | 40 | 31.6 | 32.0 | 73.0 |
| 10 | 2.4 | — | 50 | 33.7 | 28.6 | 69.5 |
| 20 | 2.4 | — | 50 | 36.9 | 30.0 | 72.9 |
| 30 | 2.4 | — | 50 | 37.4 | 31.4 | 73.9 |
| 40 | 2.4 | — | 50 | 43.3 | 32.0 | 74.9 |
| 40 | 2.4 | — | 40 | 32.6 | 27.6 | 67.5 |

We claim:

1. A product containing silicon dioxide in the form of polysilicic acid in a cellulosic supporting structure, wherein the polysilicic acid contains aluminum silicate sites.

2. A product according to claim 1, wherein the weight of aluminum calculated as aluminum oxide is 0.1 to 20.0% of the product's weight.

3. A product according to claim 1 wherein the cellulose is regenerated viscose cellulose in which the cellulose and the polysilicic acid are homogenously distributed in the same phase.

4. A product according to claim 1, wherein the weight of aluminum calculated as aluminum oxide is 0.5% to 15.0% of the product's weight.

5. A method for the preparation of a product containing silicon dioxide in which the cellulose and the silicon dioxide in the form of polysilicic acid are blended to obtain a solid blended product, wherein the blended product obtained is modified with a compound containing aluminum which causes aluminum silicate sites to be formed on the polysilicic acid.

6. A method according to claim 5, wherein the cellulose containing silicon dioxide in the form of polysilicic acid is obtained by blending an alkaline solution of silicon dioxide and viscose and subsequently regenerating the cellulose by passing it through an acid bath, the resultant product being modified with a compound containing aluminum.

7. A method according to claim 6, wherein the modification is carried out with a solution containing aluminate anions.

8. A method according to claim 7, wherein the modification is carried out with sodium aluminate solution.

* * * * *